Patented July 20, 1954

2,684,321

UNITED STATES PATENT OFFICE 2,684,321

SKIN TREATING ION EXCHANGE MIXTURE

Francis M. Thurmon, Boston, Mass., and Robert Kunin, Trenton, N. J., assignors to Rohm & Haas Company, Philadelphia, Pa., a corporation of Delaware No Drawing. Application September 28, 1950, Serial No. 187,357

10 Claims. (Cl. 167—58)

This invention relates to compositions which comprise a mixture of four types of ion exchange materials in a finely divided state. These four types are (1) sulfonated ion exchange products in their hydrogen form, (2) quaternary ammonium anion exchange resins in a basic form, (3) carboxylic resin exchangers in their hydrogen form, and (4) amino anion exchange resins in their basic form. The mixture is normally dispersed in a carrier or diluent and may be used in powder form or in the form of a suspension or dispersion in a hydrophilic liquid, lotion, or ointment base. The mixture possesses useful therapeutic properties and is desirably applied to external body surfaces, particularly for correcting or overcoming venenation as from poison ivy, poison oak, poison sumac, poison-wood, and other plants which cause dermatitis by contact with leaves, flowers, bark, stems, hairs, or juice. The compositions applied to inflamed, blistered, or raw areas bring effective relief and absorb, neutralize, or destroy the toxic and irritating substances which are involved. The compositions of this invention are also peculiarly effective in checking, relieving, or overcoming skin irritations, including erythema, pustules, papules, vesicles, bullae, and lesions caused by chemicals, botanical and biological irritants, and the like and subsequent infections. These compositions tend to prevent cutaneous sensitization.

Sulfonated ion exchange materials in their hydrogen form are available from a number of sources. They are insoluble products which can exchange hydrogen for metal ions of soluble salts, thus being capable of lowering the pH of solutions of salts to low values. For example, a tenth normal solution of salt when contacted with a sulfonated ion exchanger gives a pH below two. Such exchanger may be an insoluble phenol-formaldehyde condensate having methylene sulfonic groups. There may likewise be used styrene copolymers which are insolubilized by means of a cross-linking agent such as divinylbenzene or trivinylbenzene and which contain sulfonic groups in nuclear positions. "Carbonaceous zeolites," prepared by sulfonation or sulfonation and oxidation of coals and lignites may be used, as also sulfonated condensed lignins. All of these are cation exchange materials which in their hydrogen form are highly acidic or give a high degree of acidity to dilute salt solutions because they are capable of splitting salts, exchanging hydrogen ions for metal ions. Various types of strongly acidic sulfonated cation exchangers are well known.

The quaternary ammonium resins are strongly basic materials which are capable of splitting salts, supplying hydroxyl ions for other anions. They are insoluble quaternary ammonium compounds in which the anion is a hydroxyl ion or the anion of an exceedingly weak acid, such as carbonic acid, including the bicarbonate ion, or boric acid. The N-substituents comprise first of all one or more resin-forming groups or parts and then small hydrocarbon or hydroxyalkylene groups. The functional group of these anion materials may be represented in its simplest form as

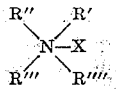

where X is a hydroxyl group or anion of a weak acid, $R''''$ is a copolymer chain to which the nitrogen is attached and $R'$, $R''$, and $R'''$ are small hydrocarbon or hydroxyalkyl groups, such as methyl, ethyl, propyl, butyl, benzyl, hydroxyethyl, hydroxypropyl, or the like. Typical quaternary ammonium ion exchange resins are prepared from styrene by copolymerization with a cross-linking agent such as divinylbenzene, chloromethylation of the copolymer, and reaction of chloromethyl groups with a tertiary amine, such as trimethylamine, triethylamine, butyldimethylamine, benzyldimethylamine, hydroxyethyldimethylamine, or the like. The chloride ion is replaced by treatment with a solution of a base such as sodium hydroxide. Styrene may also be cross-linked with methylene groups, halomethylated, and then quaternized. The quaternary ammonium anion exchange resins are capable of splitting salts and yielding solutions having a high degree of basicity, a pH of over 11 being readily attained in dilute solutions of electrolytes.

Details of the preparation of strongly basic anion exchangers have been presented by Charles H. McBurney in U. S. Patent 2,591,573, which issued April 1, 1952.

While a mixture of a sulfonated cation exchanger in hydrogen form and a quaternary ammonium exchanger in basic form can take up electrolytes, the application of such a mixture to body surfaces encounters some difficulties and disadvantages. For instance, the pH of the skin is not properly controlled. Yet, it has been found, both the sulfonated exchangers and the quaternary ammonium exchangers can take up not only truly ionic materials but also absorb or react with basic or acidic substances occurring on the skin through contamination or as a result of such contamination. The use, therefore, of these materials could become important for correcting or alleviating such conditions.

The use of the mixture of sulfonated exchanger and quaternary ammonium exchanger, it has now been found, becomes practical and safely effective when to this mixture there are added a cation exchange resin having carboxy groups and an anion exchange resin depending for its activity on amino groups. The mixture of these two latter types of exchangers serves as a buffer or correctant for the first pair. The mixture absorbs toxins and decomposition products and maintains essentially normal conditions of pH in areas to which the combination of all four kinds of resins is applied.

The carboxylic cation exchange resins are insoluble polymeric substances which contain the —COOH group as the functional group thereof. These resins are obtainable from carboxylic acids (or their anhydrides) having an unsaturated linkage which permits them to enter into copolymers or heteropolymers with polymerizable substances including those which cause cross-linking. It is known, for instance, that maleic anhydride and styrene can be polymerized together and when there is present an unsaturated material having at least two non-conjugated double bonds, an insoluble resin results. The cross-linking material may be one such as divinylbenzene, trivinylbenzene, ethylene diacrylate, diallyl maleate or fumarate or itaconate, or the like. Another source of carboxylic exchangers is based on the copolymerization of acrylic or methacrylic acid and a polyunsaturated polymerizable substance such as diallyl maleate or fumarate or itaconate, allyl acrylate, allyl methacrylate, diallyl ether, ethylene dimethacrylate, divinylbenzene, or the like. The copolymers or heteropolymers are formed in the conventional way with the aid of a catalyst, such as benzoyl peroxide, lauroyl peroxide, tert.-butyl perbenzoate, tert.-butylhydroperoxide, etc. The resin when formed may be crushed to a fine powder. The insoluble carboxylic resins may also be formed by emulsion polymerization and then precipitated as fine particles. Acid anhydride groups are converted to carboxyl groups by treatment of resins with an alkali or a strong acid. If alkali is used, the resulting salt form of resin is readily converted to the acid form by washing with acid. Some of the carboxylic groups may be used to hold a salt-forming material which has therapeutic value, such as zinc, copper, lead, or a basic substance having an amino group, such as a surface anesthetic. The carboxylic-type cation exchangers are known in the art.

Amino anion exchange resins are available from a number of sources. Phenols, aldehydes or ketones, and strongly basic amines can be condensed together by known methods to give insoluble resins which take up acids. Particularly useful exchange resins of this sort are those made from polyphenylol compounds, such as di(hydroxyphenyl)methane or di(hydroxyphenyl)-sulfone, formaldehyde, and polyalkylenepolyamines, such as triethylenetetramine or tetraethylenepentamine. Another type of anion exchange material is prepared by chloromethylating an insoluble styrene copolymer, such as one from styrene and divinylbenzene, and then reacting the chloromethylated product with an amine having hydrogen on the amino nitrogen. Polyamines such as diethylenetriamine, triethylenetetramine, tetraethylenepentamine, and the like are particularly useful, although such amines as dimethylamine, diethylamine, methylamine, ethylamine, ethanolamine, and the like also give very useful amino anion exchange products. Another type of anion exchange resin is prepared from urea or melamine or the like, formaldehyde, and a polyamine, such as one of those named above or such a combination which includes guanidine or biguanide. Yet another type is based on phenylenediamine. As is known, m-phenylenediamine and formaldehyde give insoluble resinous materials which have capacity for taking up acids. Other types of amino exchangers can be used. These anion exchange resins contain tertiary or secondary amine groups, or both, which have capacity for absorbing acids and yet do not have any marked tendency for splitting salts of strong bases and strong acids. Many of the amino anion exchange resins have already been fully described in the art. Others are discussed in application Serial No. 759,309, filed by Charles H. McBurney on July 7, 1947, now U. S. Patent 2,591,574, issued April 1, 1952.

In the mixture of the four kinds of ion exchange products the amount of sulfonated exchanger should be approximately stoichiometrically equivalent to the amount of strongly basic quaternary ammonium resin. Similarly, it is desirable that the amount of carboxylic resin be about stoichiometrically equivalent to the amino anion exchanger, although a small relative excess of either does not seriously upset or interfere with the overall value of the entire mixture. The ratio of the first pair of exchangers, sulfonated product and quaternary ammonium resin, to the second pair, carboxylic resin and amino resin, may vary from about 2:1 to about 1:5 by weight. A relatively large proportion of the first pair gives high capacity for absorbing undesirable substances effectively, while relatively large proportions of the second pair increase the buffering capacity of the total mixture.

The various exchange materials are prepared in a finely divided state and mixed. Sizes finer than 100 mesh should be used and preferably the mesh size should be such that the resin particles pass a 250 or a 325 mesh screen. The resulting composition can be applied as a finely powdered mixture, as a dusting powder prepared by mixing the four types of resins with finely divided solid extenders, or as a lotion, paste, or ointment prepared by suspending or dispersing the four types of resins in a hydrophilic liquid or hydrophilic ointment base.

The mixture of the four kinds of resins in finely divided form may advantageously be extended with inert solids, such as frequently used in body powders. Finely particled talc or clay, starch, zinc stearate or magnesium stearate, or combinations of such materials may be used. Talc or kaolin may be used to carry a humectant, such as glycerine, or a wetting agent, or some therapeutically active material.

A typical powder may contain 25% to 75% of the mixture of the four kinds of exchangers and 75% to 25% of a powder base composed, for example, of clay from 0% to 20%, zinc stearate from 0% to 10%, and talc up to 95%.

The mixture of four types of exchanger is most advantageously applied from suspension in a fluid or a semi-fluid medium which is hydrophilic in nature. Such a composition can be successfully applied by pouring, gently applying, or smearing on surfaces to be treated, even though such surfaces are highly inflamed or raw. The liquid vehicle may be one such as glycerin or a thickened aqueous solution, such as a solution of a gum or gum-like material in water. Solutions of tragacanth, karaya, quince seed gum, pectin, Irish moss, alginates, cellulose ethers, and polyethylene glycols, or combinations of two or more of these can be used. The vehicle may also comprise an emulsified oil or wax in an aqueous medium. The vehicle may be of low or high viscosity. As the concentration of thickening agent increases, the composition becomes a paste, a cream, or an ointment.

For relatively viscous preparations ointment bases may be used in which waxes, spermaceti, cetyl alcohol, lanolin, petrolatum, oils, stearic acid, or the like are dispersed in an aqueous medium. Emulsifiers are used such as ethanolamine soaps, glyceryl monolaurate, glycol monolaurate, glyceryl monostearate, or other emulsifying or dispersing agent including sulfonates and sulfates, non-ionic wetting agents, and quaternary ammonium salts. Since it is important that the ointment base be hydrophilic in nature, ointment bases made from the above materials should be oil-in-water emulsions. Hydrophilic bases include those prepared with bentonites, which swell with water and form aqueous gels, and aqueous gels formed with gums, cellulose ethers, waxy polyethylene glycols, pectins, etc. and combinations of the various materials. Many suitable formulas are given in treatises and handbooks on pharmaceutical and cosmetic preparations.

The mixture of four types of exchangers may constitute 10% to 60% of a composition formulated with a liquid, paste, or ointment base. The resulting compositions have suitable properties of application, retention, and effectiveness of the resin mixture.

As illustrative of the compositions of this invention and their therapeutic application, there follow some typical formulations.

*Example 1*

There are mixed in finely divided state 100 parts by weight of an insoluble resin having sulfonic acid groups prepared from styrene and divinylbenzene by copolymerization followed by sulfonation, 200 parts of an anion exchange resin prepared from styrene and divinylbenzene by copolymerization followed by chloromethylation, reaction with trimethylamine to form a quaternary salt, and conversion to the hydroxyl form by treatment with sodium hydroxide, 100 parts of a cation exchange resin prepared from methacrylic acid and divinylbenzene (95:5) by copolymerization and 100 parts of an amino anion exchange resin prepared from bis-(hydroxyphenyl)methane, formaldehyde, and polyalkylenepolyamines. The mixture is suspended in glycerine in the ratio of 50 parts of the mixture to 100 parts of glycerine.

This composition can be effectively applied to skin areas with vesicles, bullae, and papules caused by poison ivy. Relief occurs promptly, followed by the involution of vesicles and bullae.

Another useful combination of the above resins is made from 100 parts each of the sulfonic exchanger and quaternary ammonium hydroxide exchanger and 50 parts each of the carboxylic exchanger and the amino anion exchanger. Results in the treatment of pruritic moist dermatoses are the same as those described above.

*Example 2*

There are mixed in the form of powders 100 parts of a phenol-formaldehyde resin having methylene sulfonic groups, 100 parts of an anion exchange resin prepared from styrene and divinylbenzene, by copolymerization followed by chloromethylation, reaction of the chloromethylated product with dimethylethanolamine, and conversion of the resulting quaternary salt to the hydroxide by washing with a caustic soda solution, 80 parts of a carboxylic exchanger comprising a copolymer of acrylic acid and divinylbenzene, and 120 parts of an anion exchanger resin having amino groups prepared from a copolymer of styrene and divinylbenzene by chloromethylation followed by reaction with a polyalkylenepolyamine mixture and washing of the resulting product with soda ash solution. This mixture in an amount of 25 parts of ion exchange resins is stirred into 75 parts of an ointment base which is prepared from glyceryl monocarboxylates 15 parts, spermaceti 5 parts, ethoxyethoxyethanol 5 parts, water 75 parts, and a preservative. The consistency of the preparation may be altered by incorporating additional water. The resulting ointment is effective for controlling and overcoming the dermatoses caused by *Rhus toxicodendron*, *Rhus quercifolia*, *Rhus diversiloba*, *Toxicodendron vernix*, *Metopium toxiferum*, etc. or caused by such plants as *Pastinaca sativa*, *Cypripedium* spp., *Euphorbia* spp., *Primula obconica*, *Urtica* spp. etc.

Instead of the proportions used above for the mixture of resins there can be used 100 parts of the sulfonated phenolformaldehyde resin, 100 parts of the quaternary ammonium hydroxide resin, 320 parts of the carboxylic resin and 480 parts of the amino anion exchange resin. This mixture is then dispersed in the ointment base or lotion as above and is similarly effective.

*Example 3*

There are mixed in finely divided form 100 parts of a cation exchange resin prepared from a copolymer of styrene and polyvinylbenzene by sulfonation, 200 parts of a strongly basic anion exchange resin prepared from a copolymer of styrene and divinylbenzene through chloromethylation, reaction of the chloromethylated resin with trimethylamine, and conversion of the resulting quaternary salt to hydroxide, 75 parts of a cation exchange resin prepared by copolymerization of methacrylic acid and divinylbenzene, and 75 parts of an anion exchange resin prepared by condensation of 2,2-diphenylolpropane, formaldehyde, and tetraethylenepentamine and insolubilization of the condensate by heat. There is also prepared a lotion from 3.5 parts of glyceryl monostearate, 2.5 parts of oleic acid, 5 parts of glycerin, 5 parts of alcohol, 1 part of triethanolamine, and 83 parts of water together with a small amount of preservative and perfume. There are then combined 450 parts of the mixed resins and 1250 parts of the lotion. The resulting composition is effective against plant venenata and venenata resulting from the handling of plants and plant products, as in the processing of botanicals and the like.

*Example 4*

A mixture is prepared from 65 parts of a sulfonated styrene-divinylbenzene copolymer cation exchanger, 140 parts of a quaternary ammonium anion exchange resin prepared from styrene and divinylbenzene as in above examples through chloromethylation, reaction with a tertiary amine, benzyldimethylamine, conversion with caustic soda solution to the hydroxide, and a rinsing with a boric acid solution, 100 parts of a carboxylic cation exchanger from methacrylic acid and divinylbenzene, and 95 parts of an insoluble diphenylolpropane, formaldehyde, tetramethylenepentamine resin. There are then ground together in a pebble mill 400 parts of the above mixture and 600 parts of a powder base containing 75% of talc, 5% of zinc stearate, and 20% of kaolin. The resulting composition is absorbent, adhesive, useful in protecting delicate surfaces, and effective in promoting the disappearance of macular erythema.

The mixture of the four types of ion exchange materials provides effective preparations for relief, alleviation, and recovery from dermatoses provoked by contact with poisonous plants, chemicals, botanicals, and the like. The mixture prevents or overcomes contact irritations and subsequent infections. Through its rapid action it prevents cutaneous sensitization and trauma.

We claim:

1. A therapeutic composition comprising an intimate mixture in a finely divided state of (1) a sulfonated cation exchanger in its hydrogen form, (2) a quaternary ammonium anion exchange resin in a basic form, (3) a carboxylic cation exchange resin in its hydrogen form, and (4) an amino anion exchange resin in its basic form.

2. A therapeutic composition comprising an intimate mixture in a finely divided state of (1) a sulfonated cation exchanger in its hydrogen form, (2) a quaternary ammonium anion exchange resin in a basic form, the amount of said sulfonated cation exchanger being approximately equivalent stoichiometrically to said ammonium anion exchange resin, (3) a carboxylic cation exchange resin in its hydrogen form, and (4) an amino anion exchange resin in its basic form, the amount of said carboxylic cation exchange resin being approximately equivalent to said amino anion exchange resin, the proportion by weight of said sulfonated cation exchanger and said ammonium anion exchange resin together to the weight of the said carboxylic exchange resin and said amino anion exchange resin together being from about 2:1 to about 1:5.

3. A therapeutic composition comprising a mixture containing 75% to 25% of a powder base and 25% to 75% of a finely divided, intimate mixture of (1) a sulfonated cation exchanger in its hydrogen form, (2) a quaternary ammonium anion exchange resin in a basic form, the amount of said sulfonated cation exchanger being approximately equivalent stoichiometrically to said ammonium anion exchange resin, (3) a carboxylic cation exchange resin in its hydrogen form, and (4) an amino anion exchange resin in its basic form, the amount of said carboxylic cation exchange resin being approximately equivalent to said amino anion exchange resin, the proportion by weight of said sulfonated cation exchanger and said ammonium anion exchange resin together to the weight of the said carboxylic exchange resin and said amino anion exchange resin together being from about 2:1 to about 1:5.

4. A therapeutic composition comprising dispersed in a hydrophilic liquid a finely divided mixture of (1) a sulfonated cation exchanger in its hydrogen form, (2) a quaternary ammonium anion exchange resin in a basic form, the amount of said sulfonated cation exchanger being approximately equivalent stoichiometrically to said ammonium anion exchange resin, (3) a carboxylic cation exchange resin in its hydrogen form, and (4) an amino anion exchange resin in its basic form, the amount of said carboxylic cation exchange resin being approximately equivalent to said amino anion exchange resin, the proportion by weight of said sulfonated cation exchanger and said ammonium anion exchange resin together to the weight of the said carboxylic exchange resin and said amino anion exchange resin together being from about 2:1 to about 1:5.

5. The composition of claim 4 in which the liquid is glycerine and the mixture of finely divided exchange materials constitutes 10% to 60% of the composition.

6. A therapeutic composition comprising dispersed in a hydrophilic ointment base a finely divided mixture of (1) a sulfonated cation exchanger in its hydrogen form, (2) a quaternary ammonium anion exchange resin in a basic form, the amount of said sulfonated cation exchanger being approximately equivalent stoichiometrically to said ammonium anion exchange resin, (3) a carboxylic cation exchange resin in its hydrogen form, and (4) an amino anion exchange resin in its basic form, the amount of said carboxylic cation exchange resin being approximately equivalent to said amino anion exchange resin, the proportion by weight of said sulfonated cation exchanger and said ammonium anion exchange resin together to the weight of the said carboxylic exchange resin and said amino anion exchange resin together being from about 2:1 to about 1:5, the mixture of finely divided exchange materials constituting 10% to 60% of the composition.

7. A therapeutic composition comprising an intimate admixture in a finely divided state of (1) an insoluble cation exchange sulfonated cross-linked styrene resin in its hydrogen form, (2) an insoluble quaternary ammonium anion exchange resin in a basic form having basic quaternary ammonium groups attached to nuclearly bound methylene radicals of a cross-linked styrene resin, the amount of said sulfonated styrene resin being approximately stoichiometrically equivalent to said ammonium anion exchange resin, (3) an insoluble methacrylic acid-divinylbenzene copolymer in its acidic form, and (4) an insoluble diphenylolalkane, formaldehyde, polyethylenepolyamine anion exchange condensate in its basic form, the amount of said methacrylic acid-divinylbenzene copolymer being approximately stoichiometrically equivalent to said condensate, the proportion by weight of said sulfonated cross-linked styrene resin and said ammonium anion exchange resin together to the weight of the said methacrylic acid-divinylbenzene copolymer and said condensate together being from about 2:1 to about 1:5.

8. A therapeutic composition in which the mixture of ion exchange materials of claim 7 is dispersed in a hydrophilic base, the said mixture constituting 10% to 60% of the composition.

9. A therapeutic composition comprising an intimate admixture in a finely divided state of (1) an insoluble sulfonated phenol-formaldehyde cation exchange resin in its hydrogen form, (2) an insoluble quaternary ammonium anion exchange resin in a basic form having quaternary ammonium groups attached to nuclearly bound methylene radicals of a cross-linked styrene resin, the amount of said sulfonated phenol-formaldehyde resin being approximately stoichiometrically equivalent to said quaternary ammonium anion exchange resin, (3) an insoluble methacrylic acid-divinylbenzene cation exchange copolymer in its acid form, and (4) an insoluble diphenylolpropane - formaldehyde - polyethylenepolyamine anion exchange condensate in its basic form, the amount of said cation exchange copolymer being approximately stoichiometrically equivalent to said condensate, the proportion by weight of said sulfonated phenol-formaldehyde resin and said quaternary ammonium anion exchange resin together to the weight of the said methacrylic acid-divinylbenzene copolymer and said condensate together being from about 2:1 to about 1:5.

10. A therapeutic composition in which the mixture of ion exchange materials of claim 9 is dispersed in a hydrophilic base, the said mixture constituting 10% to 60% of the composition.

References Cited in the file of this patent

UNITED STATES PATENTS

| Number | Name | Date |
|---|---|---|
| 2,118,566 | Miles | May 24, 1938 |
| 2,160,503 | Herrmann | Nov. 30, 1939 |
| 2,185,178 | Beutner | Jan. 2, 1940 |
| 2,431,481 | Hurd | Nov. 25, 1947 |
| 2,501,927 | Block | Mar. 28, 1950 |
| 2,578,938 | Kunin | Dec. 18, 1951 |

FOREIGN PATENTS

| Number | Country | Date |
|---|---|---|
| 524,125 | Great Britain | July 30, 1940 |

OTHER REFERENCES

Bentonite Technology and Industrial Uses, 1935, American Colloid Sales Division Inc., Data No. 216.

Winters: Industrial and Engineering Chemistry, vol. 41, No. 3, pages 460–463.